United States Patent

[11] 3,630,498

| [72] | Inventor | George D. Bielinski |
| | | Green Bay, Wis. |
| [21] | Appl. No. | 749,188 |
| [22] | Filed | July 31, 1968 |
| [45] | Patented | Dec. 28, 1971 |
| [73] | Assignee | Namco Corporation |
| | | Green Bay, Wis. |

[54] APPARATUS FOR GASIFYING AND DEGASIFYING A LIQUID
7 Claims, 28 Drawing Figs.

[52] U.S. Cl. .................................................. 261/87, 261/120, 210/242, 210/220, 210/219, 210/94
[51] Int. Cl. ................................................................ B01f 3/04
[50] Field of Search ........................................ 261/87, 93, 120; 210/219, 197, 170, 220, 242, 94, 95, 221, 208

[56] References Cited
UNITED STATES PATENTS

| 939,497 | 11/1909 | Hammett | 210/220 X |
| 1,124,855 | 1/1915 | Callow et al. | 261/87 |
| 2,054,395 | 9/1936 | Streander | 261/91 X |
| 2,246,560 | 6/1941 | Weinig et al. | 261/93 |
| 2,638,444 | 5/1953 | Kappe | 210/220 X |
| 2,678,914 | 5/1954 | Kalinske | 210/219 |
| 2,744,065 | 5/1956 | Lacey | 210/220 X |
| 3,043,433 | 7/1962 | Singer | 210/221 X |
| 3,092,678 | 6/1963 | Braun | 261/87 X |
| 3,122,501 | 2/1964 | Hultgren | 210/94 |
| 3,152,982 | 10/1964 | Pagnotti | 210/197 X |
| 3,189,334 | 6/1965 | Bell | 261/93 |
| 3,365,178 | 1/1968 | Boyd | 261/93 |
| 3,371,779 | 3/1968 | Hollingsworth et al. | 261/87 X |
| 3,374,893 | 3/1968 | Stretton | 210/220 X |
| 3,416,729 | 12/1968 | Ravitts et al. | 261/91 X |
| 3,459,303 | 8/1969 | Bradley | 210/208 X |

FOREIGN PATENTS

| 1,113,210 | 8/1961 | Germany | 261/87 |

Primary Examiner—Tim R. Miles
Attorney—Wheeler, House & Wheeler

ABSTRACT: This disclosure relates to apparatus for gasifying and degasifying liquid. The gasifying apparatus introduces tiny gas bubbles into the liquid in vast quantities to surcharge the liquid with adsorbed gas greatly in excess of the capacity of the liquid to absorb said gas. The bubbles are introduced in a cavitation technique in which the bubbles are shattered into myriad tiny bubbles so small that they will remain in suspension in the liquid for long periods of time where they will be readily available for absorption into the liquid as its chemical and biological demand requires. The degasifying apparatus uses a reverse cavitation principle to withdraw gas from the liquid in the form of larger bubbles which will rise to the surface to discharge the gas from the liquid.

Patented Dec. 28, 1971
3,630,498
6 Sheets-Sheet 1
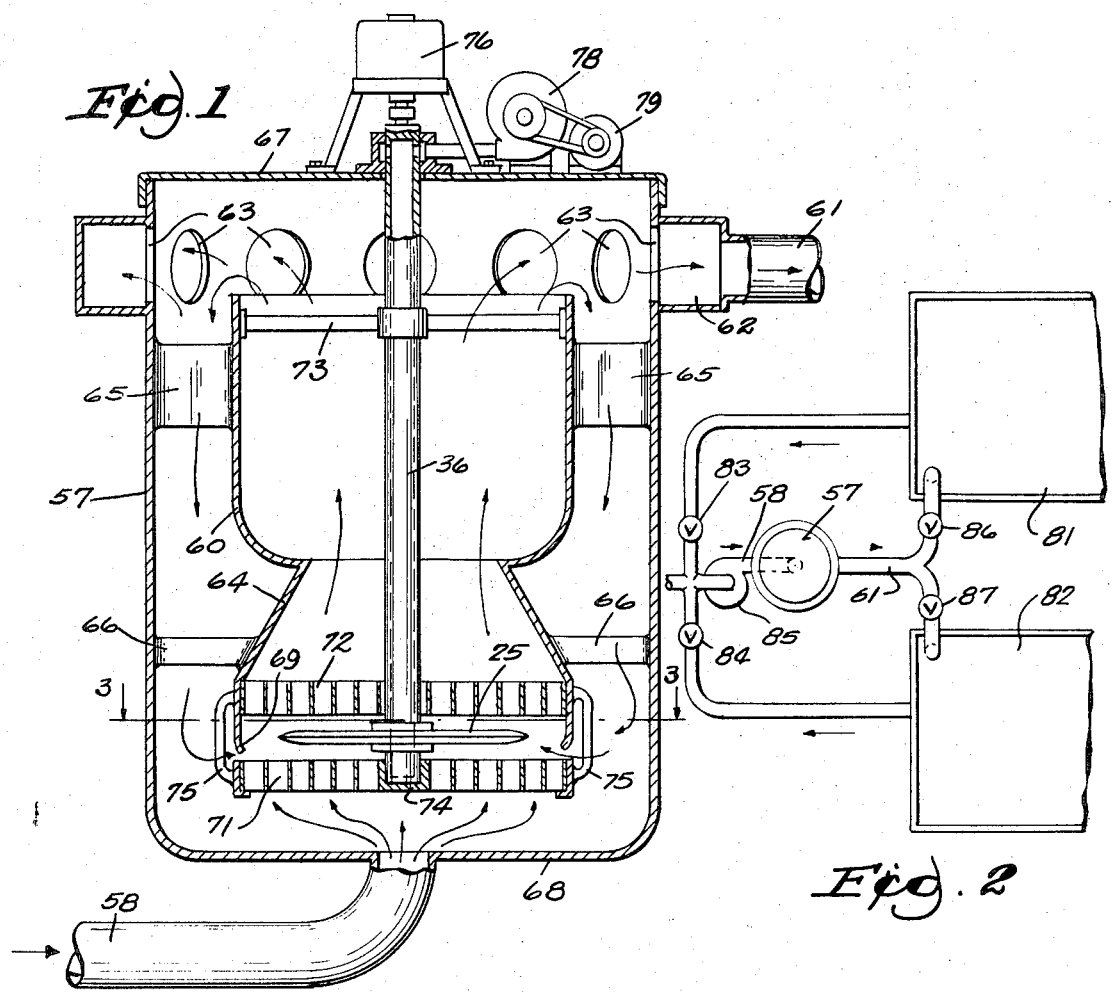
Fig. 1
Fig. 2
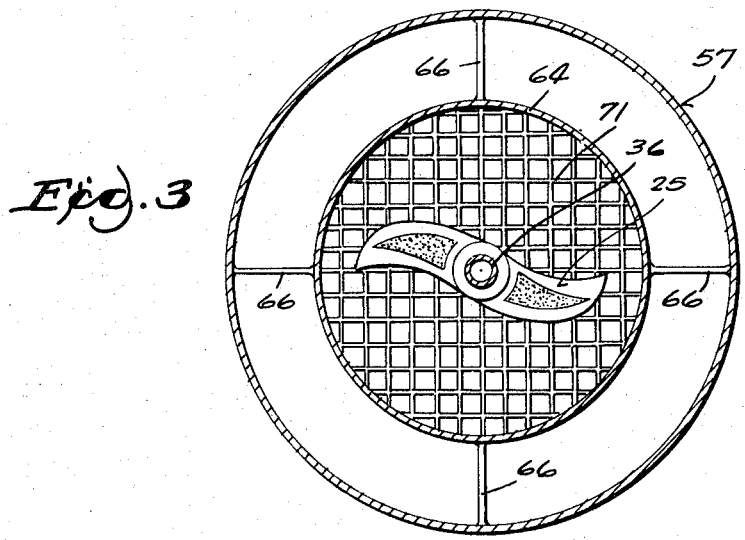
Fig. 3
INVENTOR
GEORGE D. BIELINSKI
BY Wheeler, Wheeler, House & Clemency
ATTORNEYS

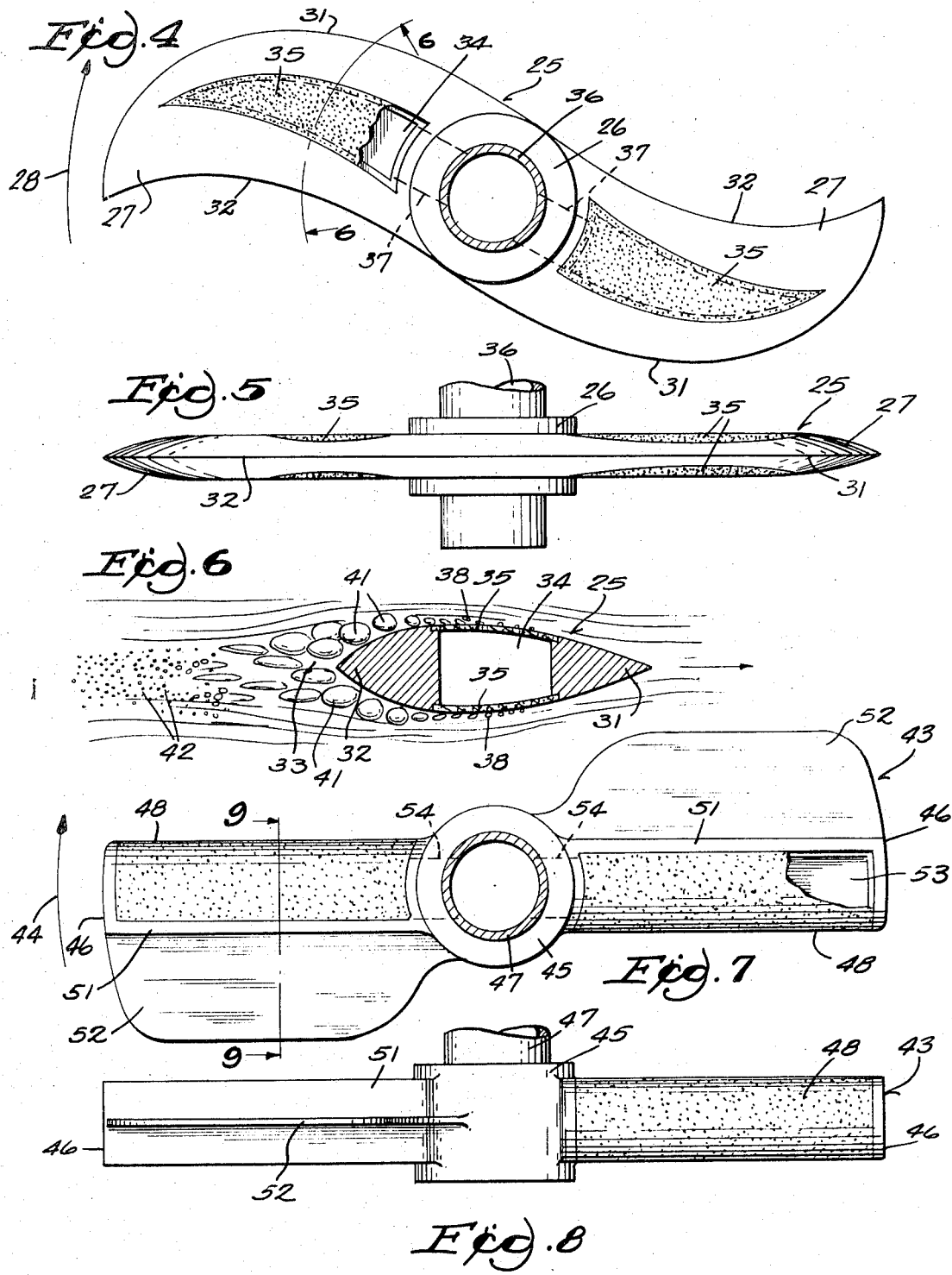

Patented Dec. 28, 1971

INVENTOR
GEORGE D. BIELINSKI
BY Wheeler, Wheeler, House & Clemency
ATTORNEYS

Patented Dec. 28, 1971

INVENTOR
GEORGE D. BIELINSKI

BY Wheeler, Wheeler, House & Clemency
ATTORNEYS

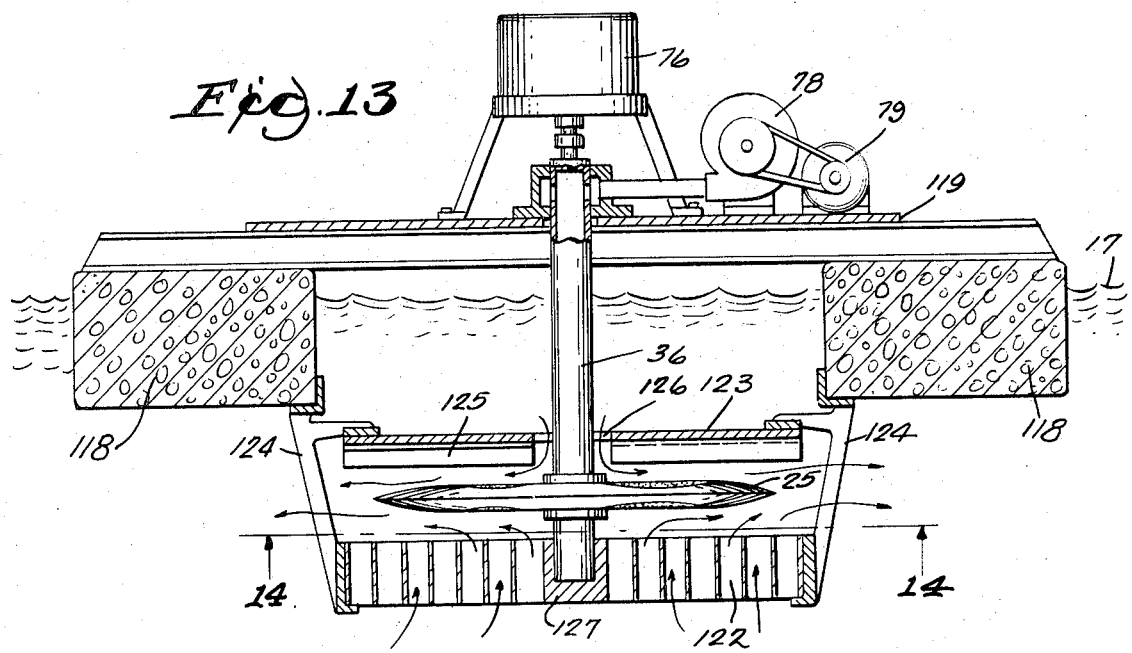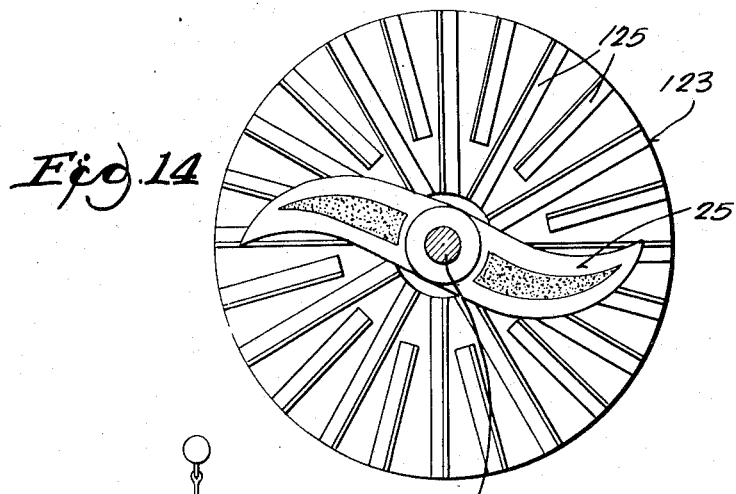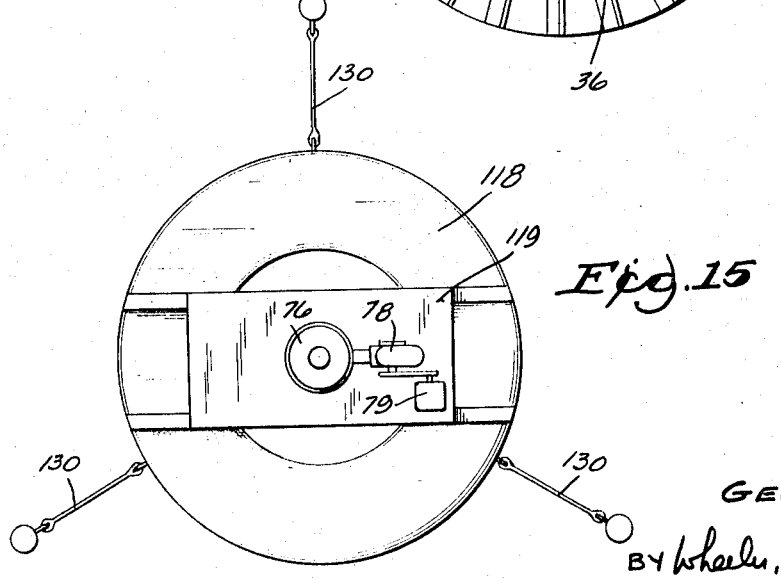

Patented Dec. 28, 1971
3,630,498
6 Sheets-Sheet 6
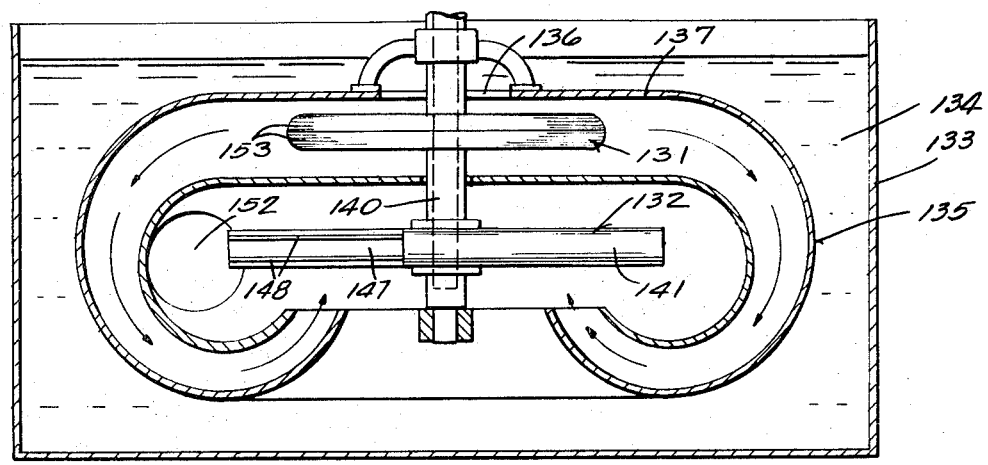
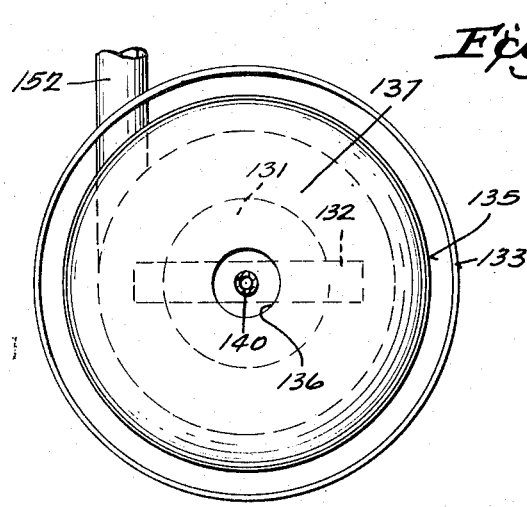
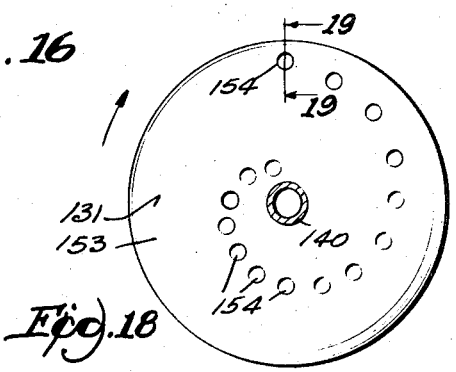
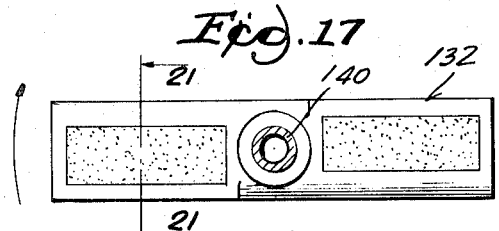
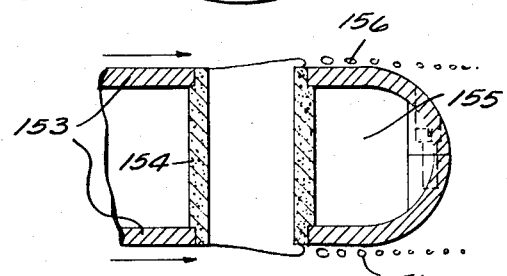
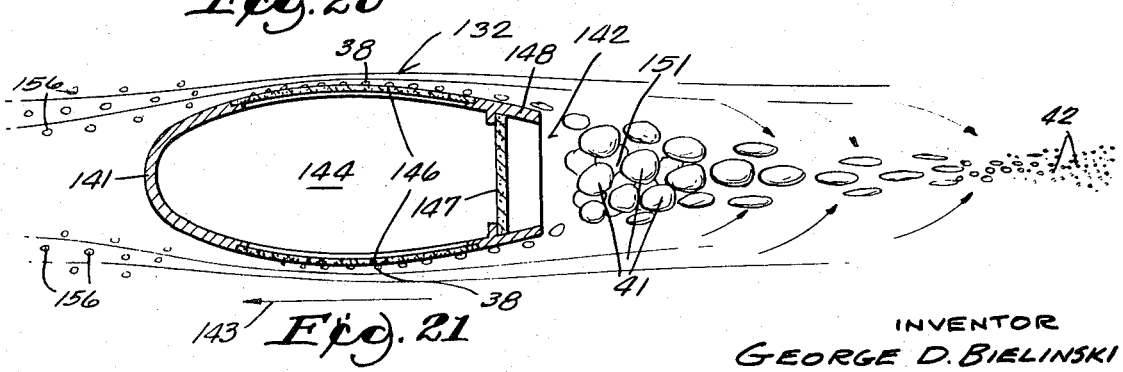
INVENTOR
GEORGE D. BIELINSKI
BY Wheeler, Wheeler, House & Clemency
ATTORNEYS

APPARATUS FOR GASIFYING AND DEGASIFYING A LIQUID

BACKGROUND OF THE INVENTION

It is generally known that it is desirable for aeration or dispersion purposes to inject gas into a liquid in the form of small bubbles. U.S. Pat. Nos. 2,448,590; 2,825,542 and 3,108,146 are examples of prior art techniques which appear in the patent literature.

SUMMARY OF THE INVENTION

The cavitation technique of the present invention greatly reduces the size of the bubbles and more widely disperses them in the liquid. The cavitation induces a bubble-shattering sequence in which bubbles injected into the liquid through a porous rotor are still further subdivided or disintegrated into myriad tiny bubbles.

The gasifying technique of the present invention enables the surcharging of the liquid with a quantity of adsorbed gas several hundred times as great as the quantity of gas which can be dissolved or absorbed in the liquid at saturation. An emulsion is formed with the adsorbed gas as the inner phase and the liquid as the outer phase. The adsorbed gas is retained in the liquid in situ where it will be immediately available for use according to the chemical or biological demands of the liquid or matter suspended in the liquid.

A very important use for the apparatus of the present invention is in purifying polluted water. Such water is aerated in sewage treatment plants, or directly in natural water courses, such as flowing streams, lakes, ponds, etc. Such polluted water has heavy chemical and biological oxygen demand. It also has industrial application, where gasifying is utilized for purposes other than pollution abatement.

The apparatus of the present invention requires relatively small amounts of power to operate because the surcharging of the liquid with adsorbed gas in the vast quantities herein contemplated will materially lighten the treated liquid. The apparatus may be housed in towerlike tanks in which a natural draft or stack effect is achieved within the tower, thus developing a pressure differential or pumping action on the liquid. This substantially eliminates the need for the expenditure of power for pumping purposes. Pumping of the liquid may be desirable, however, for example, to dilute aerated water in the water of a lake or stream.

Degasifying is achieved in accordance with the present apparatus by also utilizing the principle of cavitation to create a zone or space of reduced pressure or partial vacuum in a free space behind a rotor, thus to release undesirable gases from the liquid. Released gas bubbles collected in the cavitation space are then augmented by injecting added gas into this space, thus to increase the size of the released gas bubbles so that these bubbles will then break out of the cavitation space and will rise to the surface of the liquid and discharge their released gas content.

Other objects, features, and advantages of the present invention will appear in the following disclosure.

DESCRIPTION OF THE DRAWINGS

FIG. 1 is a vertical cross section taken through one embodiment of liquid gasifier embodying the present invention, as utilized in a sewage treatment tank tower.

FIG. 2 is a diagrammatic plan view illustrating the manner of connecting the sewage treatment tank of FIG. 1 with respect to holding ponds or tanks and a recirculating system in connection therewith.

FIG. 3 is a cross section taken along the line 3—3 of FIG. 1.

FIG. 4 is a plan view of the gasifying rotor shown in the embodiment of the invention of FIG. 1.

FIG. 5 is a side elevation of the rotor of FIG. 4.

FIG. 6 is a cross section taken along the line 6—6 of FIG. 4, liquid stream lines and bubbles created during rotor movement being shown diagrammatically.

FIG. 7 is a plan view of a modified form of rotor.

FIG. 8 is a side view of the rotor of FIG. 7.

FIG. 13 is a vertical cross section taken through a modified embodiment of the invention in which the rotor is supported on a float, in turn supported on the surface of a body of water, thus to aerate the water. FIG. 14 is an inverted plan view taken substantially along the line 14—14 of FIG. 13.

FIG. 15 is a plan view of the apparatus of FIG. 13 showing how the float may be anchored in the body of water.

FIG. 16 is a cross section taken through another apparatus embodiment of the invention in which there is tandem gasifying of a liquid.

FIG. 17 is a plan view of the interior apparatus of FIG. 16.

FIG. 18 is a plan view of the bubble-generating disc or rotor of the apparatus of FIG. 16.

FIG. 19 is an enlarged cross section taken along the line 19—19 of FIG. 18.

FIG. 20 is a plan view of the gasifying rotor of FIG. 16.

FIG. 21 is a cross section taken along the line 21—21 of FIG. 20. Liquid streamlines, bubbles, etc. are shown diagrammatically.

FIG. 22 is a side view of a small bubble before it enters the cavitation space.

FIG. 23 is a side view of the small bubble after it enters the cavitation or vacuum space and has been expanded by its internal pressure to a size several hundred times its size shown in FIG. 22.

FIG. 24 is a side view of the expanded bubble as it leaves the cavitation space and is first subject to the pressure of the liquid which begins to shatter the bubble.

FIG. 25 is a plan view of the bubble of FIG. 24.

FIG. 26 is a side view similar to FIG. 25 but showing a later stage when the bubble has been pinched off into many smaller bubbles.

FIG. 27 is a plan view of the bubbles of FIG. 26.

FIG. 28 is a view similar to FIG. 27 but showing a still later stage after the subdivided bubbles of FIGS. 26 and 27 have been repeatedly subjected to the shattering technique of FIGS. 24–27, inclusive and myriad tiny bubbles have been formed and reached a substantially steady state condition.

DESCRIPTION OF THE PREFERRED EMBODIMENTS

Figures 9, 10:
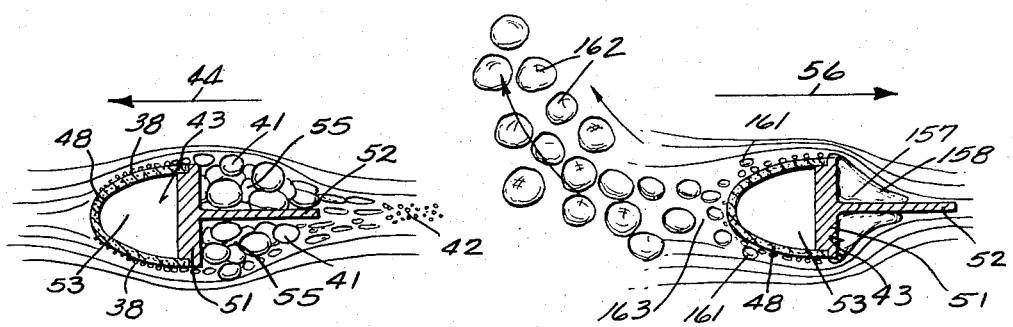
FIG. 9 is a cross section on a reduced scale along the line 9—9 of FIG. 7. This view also illustrates diagrammatically liquid streamlines, bubbles, etc. formed during rotor movement to perform the cavitation sequence for gasifying the liquid.
FIG. 10 is a view similar to FIG. 9 but illustrating reverse rotation of the rotor, with diagrammatic illustration of liquid streamlines, bubble formation, etc. for the degasifying sequence.
Figure 22:
FIGS. 22–28 diagrammatically illustrate the cavitation technique of the present invention for the initial expansion of a small bubble to a large bubble size in a cavitation space and the shattering of the expanded large bubble into myriad tiny bubbles. The sequence is as follows.
Figure 23:
Figure 24:
Figure 25:
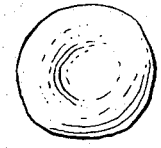
Figure 26:
Figure 27:
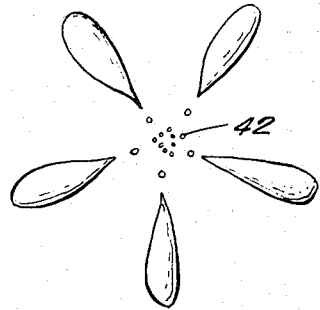
Figure 28:
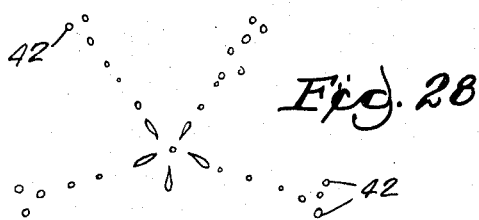

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

While the present invention may be utilized to gasify and degasify any liquid, the description of the invention will proceed primarily with respect to the apparatus for aerating and degasifying polluted water, typically in environments for sewage treatment and the aeration of water courses such as flowing streams, stagnant ponds or lakes, etc., where pollution has depleted or threatens to deplete the normal supply of dissolved or absorbed oxygen in the water. In these environments it is highly desirable to oxygenate or aerate the water to satisfy its chemical or biological oxygen demand and to purify the water.

The prior patents mentioned earlier herein illustrate prior art suggestions to add gas to liquid by injecting the gas into the liquid through a rotor or propeller blade having gas holes or pores by which the gas is injected into the liquid in the form of small bubbles. According to the apparatus of the present invention, very tiny bubbles in the typical approximate size of 10 microns in diameter, but ranging in size from 2 to 20 microns in diameter, can be surcharged into the liquid in vast quantities with low-power requirements for massive gasifying or aeration of the liquid. These tiny bubbles are much smaller than any bubbles heretofore introduced into liquid.

A key technique of the gasifying sequence of the present invention is the utilization of a cavitation principle for first expanding gas bubbles in a low-pressure cavitation space and then shattering the expanded bubbles into myriad tiny bubbles as the expanded bubbles leave the aeration space and enter the liquid at its normal pressure. This results in the introduction of the gas into the liquid in a form where it will remain suspended for long periods of time. The first increments of gas thus injected in the liquid will be absorbed or dissolved in the water. As soon as the water becomes saturated with absorbed gas, additional bubbles of gas which are thus dispersed or injected into the liquid will be retained therein in the form of adsorbed gas, emulsified with the liquid. The adsorbed gas bubbles, ranging in diameter from 2–20 microns will remain in situ in the liquid where it is immediately available to be absorbed or utilized in its adsorbed state as required by the chemical and biological demand of the liquid. Typically, many hundreds of times the quantity of gas that can be absorbed in the liquid can be adsorbed therein by the technique of the present invention.

FIGS. 4, 5, and 6 show one form of gas injection rotor or propeller by which vast quantities of gas are injected into the liquid. This rotor 25 is utilized in the apparatus shown in some of the other figures of the drawings, for example, the apparatus shown in FIGS. 1 and 11.

Rotor 25 has a central hub 26 with laterally extending blades 27. Each blade 27 has a wing or airfoil shape in cross section, as shown in FIG. 6. The rotor is intended to be rotated in the direction of arrow 28. Accordingly, its leading sharp or streamlined edge 31 will slice through the liquid ahead of its trailing blunt edge 32. In accordance with fluid flow principles, this will create a cavitation space 33 behind the cavitation producing trailing configuration 32 of the rotor 25. FIG. 6 illustrates this diagrammatically.

Rotor 25 can be of any appropriate size, depending on available power and gasifying requirements. In typical embodiments of the invention, the rotor will range from 8 to 24 inches in diameter.

The interior of the rotor 25 is hollow, thus to form in each blade 27 an interior chamber 34. The top and bottom walls 35 of the blade 27 are formed of a gas porous material such as sintered stainless steel, ceramic, or plastic. The pore size of the porous walls 35 is desirably on the order of 8 microns in diameter.

Air or other gas will be supplied under pressure to the interior or cavity 34 through a hollow drive shaft 36, the interior of which is ducted to the cavities 34 through interior ducts 37.

The rotor 25 will be rotated at such a speed through the liquid to form cavitation spaces 33 behind the cavitation producing trailing configuration of the blades 27. This speed will vary, depending upon the size and shape of the rotor and the viscosity and other characteristics of the liquid in which it is submerged. It is convenient to determine the speed empirically, by observing when cavitation occurs and when the maximum rate of bubble formation is achieved.

Air or other gas which is supplied under pressure to the cavities 34 will issue through the pores of the porous walls 35 in the form of small bubbles as indicated at 38 in FIG. 6. The bubble size is exaggerated in the drawings and will actually be quite small because of the shearing action of the liquid through which the rotor 25 turns. These small bubbles 38 will be swept off of the porous walls 35, at a right angle to their direction of emergence therefrom, into the cavitation space 33. Cavitation space 33 constitutes a partial vacuum.

Because of their internal pressure, bubbles 38 will immediately expand in the partial vacuum of cavitation space 33 to a very large size as indicated by the bubbles 41. Bubbles 41 are several hundred times as large as bubbles 38. However, as these large bubbles 41 trail out behind the cavitation space 33 and enter the liquid at its normal liquid pressure, they will be shattered into myriad tiny bubbles 42. In early stages of gasification, bubbles 42 will instantly be absorbed into the liquid. This continues until the liquid is saturated. Thereafter, bubbles 42 will remain suspended in the water in an adsorbed state.

FIGS. 22–28 diagrammatically illustrate the expansion of a small bubble 38 to a size several hundred times as large as it enters the cavitation or vacuum space 33 to form bubble 41. The several successive shattering steps as the enlarged bubble 41 is subject to liquid pressure as the bubble 41 trails out of the cavitation space is illustrated in FIGS. 24–28, inclusive. Accordingly, a single bubble 38 is transformed into myriad tiny bubbles 42.

The tiny bubbles 42 will not rise to the surface of the water, but will remain in suspension indefinitely. The capacity of liquid to adsorb gas is many hundreds of times its capacity to absorb gas. Accordingly, vast quantities of gas can be stored or suspended in the water, carried "piggyback" by the water and instantly available.

FIGS. 7, 8, and 9 show a modified embodiment of rotor 43 which may be used as a substitute for the rotor shown in FIGS. 4, 5, and 6. For gasifying or aeration purposes, rotor 43 is rotated in the direction of arrow 44. It has a hub 45 with laterally projecting blades 46 and hollow drive shaft 47.

Each blade 46 comprises a frontally curved head or body portion 48 having an upright or transverse base wall 51 and a trailing tail or fin 52 which is at a right angle to the wall 51. The wall of head 48 is porous, like walls 35 of the embodiment of FIGS. 4–6. Wall 48 surrounds an interior hollow chamber 53 into which air or other gas may be injected from the hollow drive shaft 47, through the interconnecting ducts 54.

The vertical wall 51 and tail 52 constitute a cavitation producing trailing configuration when the rotor is rotated in the direction of arrow 44, thus to produce cavitation spaces 55 at both sides of the trail 52. Gas injected through the porous wall 48 will create a bubble pattern quite similar to that shown in FIG. 6, and the same reference characters are applied to the series of bubbles 38, 41, 42 developed therefrom. The liquid stream will shear the bubbles 38 from the porous wall 48. Bubbles 38 will enlarge to a greatly increased diameter as shown at 41 as they enter the vacuum or cavitation space 55. As the bubbles trail off behind the end of the trail 52, they will be shattered into myriad tiny bubbles 42. The tail 52 is desirably about two or three times one half the height of wall 51. This controls the size of the cavitation space 55 to allow bubbles 41 to grow sufficiently before they are shattered.

FIG. 10 illustrates rotation of the rotor 43 in the direction of arrow 56 (opposite the direction of arrow 44) for degasifying purposes, as will be hereinafter explained.

FIGS. 1, 11, 13, and 16 show liquid treatment apparatus which all incorporate an aerating prop or rotor of the type just described.

FIG. 1 shows a tank tower 57 of the type suitable for use in treating sewage or other polluted water. The tank 57 is denominated a tower because it has substantial height and structural characteristics which will produce a stack effect for gravity induced circulation or flow of the liquid through the tank, without need for the expenditure of power for pumping the liquid.

Tank 57 will typically be made in sizes to hold anywhere from 10,000 to 40,000 gallons of liquid, in this case sewage-polluted water. The incoming polluted water is admitted to the tank through an intake pipe 58 which leads into the tank at the center of its bottom wall 68. The aerated water is discharged from the tank through outlet pipe 61 which is connected near the top of the tank 57 and is connected to a collector ring 62 which communicates with the interior of the tank through a series of circumferentially spaced ports 63.

A stack forming shell 60, 64 which is mounted within the tank 57 on spider brackets 65, 66. The upper and lower ends of the shell 60, 64 are spaced respectively from the tank top wall 67 and the tank bottom wall 68. Near its bottom the shell portion 64 carries a bottom grid 71 and a top grid 72, between which is mounted a cavitation-type aerating rotor or prop 25, such as shown in FIGS. 4, 5, 6, or as alternately shown in FIGS. 7, 8, 9. The grids 71, 72 permit vertical waterflow but impede lateral waterflow, such as is induced by the rotation of the rotor 25. Thus they act as guide vanes or baffles.

Near its upper end the drive shaft 36 is supported from the shell portion 60 on a spider 73. At its lower end the shaft is supported in a bearing 74 disposed at the center of the lower grid 71.

Lower grid 71 is suspended from the shell portion 64 on hanger bracket arms 75 which are circumferentially spaced to provide liquid flow passages therebetween.

The purpose of the grids 71, 72 is to restrain the water in the vicinity of the rotor 25 from swirling around with the rotating rotor 25, thus to insure that when the rotor 25 turns, the liquid in its immediate vicinity will have relative motion with respect to the rotor and thus sweep or shear the bubbles 38 laterally from the porous walls 35 of the prop, as shown in FIG. 6.

Rotor 25 is rotated under the power of any suitable power source, such as electric motor 76 which is mounted on the tank top 67. Air is forced into the hollow interior of the shaft 36 by an air compressor type of fan 78 as powered from the electric motor 79.

As hereinbefore explained, the operation of the rotor 25 will lighten the water by surcharging it with great quantities of adsorbed air bubbles. In normal operation where vast quantities of air are adsorbed in the water, its weight will be reduced to about two thirds of the weight of the unaerated water supplied to the tank through intake pipe 58. Accordingly, the water inside of the shell 60, 64 will be lighter than the water between shell 60, 64 and the tank wall 57. Accordingly, there will be gravity induced flow of the aerated water upwardly through the stack shell 60, 64 and corresponding downward flow of water in the annular space outside the shell 60, 64. This waterflow is indicated by the arrows. Moreover, the rotation of the rotor 25 will impose centrifugal force on the water in the immediate vicinity of the rotor 25 so as to cause centrifugal flow of this water outwardly from the rotor, where it will be intercepted by the inturned lower margin 69 of the shell skirt and be turned upwardly for upward flow through the shell 60, 64.

Fully aerated water rising to the top of shell portion 60 will be partially bled off from the tank through the collector ring 62 and outlet pipe 61. Other portions of this water will flow downwardly in the space between the shell 60, 64 and tank wall 57.

In any event, the motor 76 need provide only enough power to rotate the prop 25. Flow of aerated water upwardly in the tank is induced hydrostatically by the pressure differential between light and heavy water at opposite sides of the shell 60, 64. This flow does not require any power from the motor 76.

In a typical installation, the aerated water discharged from pipe 61 is delivered to holding tanks or ponds 81, 82 where the aerated water will remain for a period of time during which the chemical and biological oxygen demand of the pollutants therein is satisfied by the oxygen present in the air which has been surcharged into the water. If there is such a great demand for oxygen so that all of the adsorbed air is used up during this holding period, suitable recirculating valves 83, 84 can be opened and intake pump 85 actuated to recirculate oxygen depleted water from tanks 81, 82 back through the aerating tank 57. The outflow of water from pipe 61 into the holding tanks 81, 82 is controlled by valves 86, 87.

Much higher concentration of oxygen can be furnished if pump 78 furnishes pure oxygen, rather than air. However, for most installations, there is a sufficiently high concentration of oxygen in ordinary air. Accordingly, the gas utilized in the polluted water treatment plant of FIG. 1 will usually be atmospheric air.

After the water has been held in the holding tanks 81, 82 for a sufficient period of time to complete the treatment for which these tanks are designed, the water will be drawn off, either for subsequent treatment or return to natural water courses.

Figure 11:
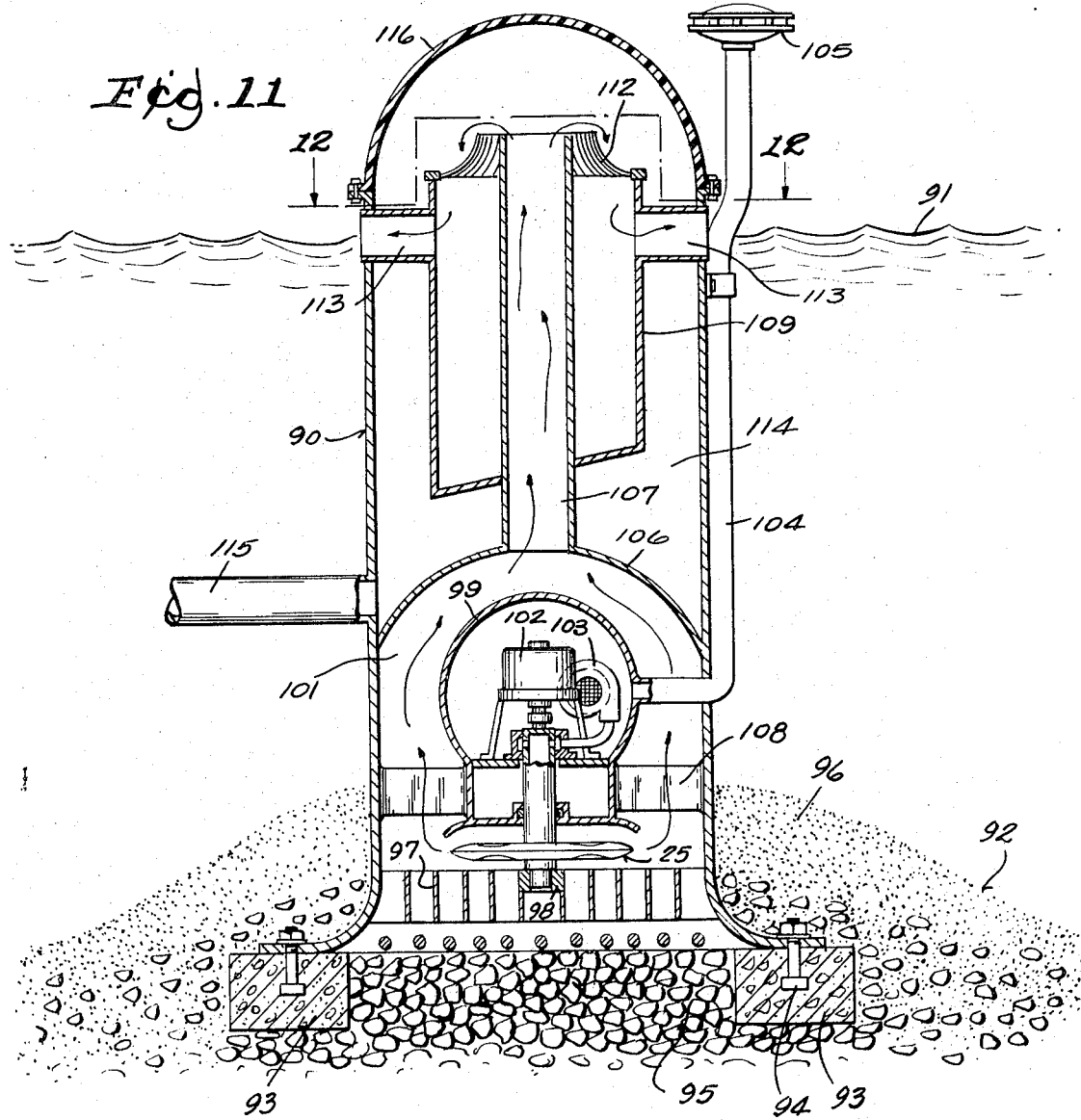
FIG. 11 is a vertical cross section taken through a modified embodiment of tower gasifier with the diagrammatic illustration of the use of such a gasifier to aerate water in a flowing stream or large body of water, such as a pond or lake.
Figure 12:
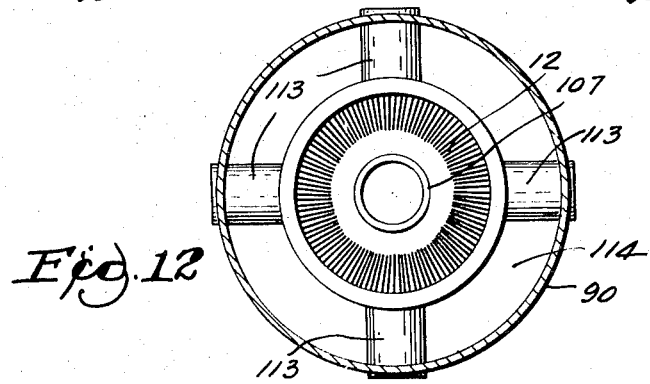
FIG. 12 is a cross section taken along the line 12—12 of FIG. 11.

FIG. 11 shows another tower embodiment of the invention. In the FIG. 11 embodiment tower 90 is much larger than the tank tower 57 of FIG. 1. Tower 90 is designed to stand free on the bottom of a natural water course, such as a flowing stream, stagnant pool, lake, etc., and is designed for purifying polluted water present in the water course. Assuming the water course to be 15 or 20 feet deep, tower 90 will be correspondingly tall. The waterline is indicated by reference character 91. The lake or stream bottom is shown at 92. A concrete base 93 is provided on which the lower end of tower 90 is anchored by bolts 94 or the like. The bottom of the lake is prepared with a gravel bed 95 and a finer sand cap 96 extending peripherally 10 to 15 feet from the base of the tower leaving the gravel open area in a circular ring (approximately 40 feet in diameter). The water that will be processed through the sand cap 96 and the gravel bed 95, thus to trap and filter out solids and to create activated sludge layers in which aerobic and anaerobic digestion occurs.

Near its bottom the tower 90 is provided with a flow-directing grid 97 which has a central bearing 98 in which the shaft 36 of rotor 25 turns. Above the rotor 25 there is a bell housing 99 in which the motor 102 and air pump 103 are disposed. Alternatively, the motor, etc., can be mounted on the top of the tower and connected to the rotor by a long hollow shaft. Air is supplied to the bell 99 through pipe 104 which extends above the surface of the water 91 and has an air intake filter 105. The bell is supported from the tower wall 90 on a spider 108.

Water within the tower which has been aerated by the prop 25 rises through an annular spherical space or duct 101 formed between bell 99 and a spherical dome 106. This carries the aerated water around the bell 99 and into a central stack 107 which extends upwardly to a level slightly above the outside water level 91. Inasmuch as the aerated water inside the stack 107 is lighter than the water outside the tower, there will be gravity or hydrostatically induced flow of water up through the stack 107 in the direction of the arrows and over the top of the stack.

The stack 107 extends centrally through an intermediate aerated water collecting chamber 109 which desirably has weirs 112 at its top surface. There water overflowing the top of the stack 107 will drop through weirs 112 into the chamber 109 and will flow back into the lake 91 through the outflow pipes 113.

Between the intermediate chamber 109 and the tower wall 90 there is a sludge-collecting sump chamber 114. Even though most solids are filtered out by the sand cap 96 and the gravel bed 95, microscopic size algae will still traverse this filter and will enter the tower. However, the myriad bubbles formed by aerating the water will tend to flocculate the algae into clumps of foamed algae sludge large enough to be caught on the weir 112. This flocculated algae will be discharged from weir 112 into the chamber 114 and may be periodically or continuously removed through the discharge pipe 115 for use as a byproduct or for disposal.

The pressure differential which will keep the water moving through the tower 90 results from the difference in the density between aerated water in duct 101 and stack 107 and the unaerated water in the stream 91.

The device shown in FIG. 11 has the advantage of not stirring up the bottom spoils of the river which are undergoing anaerobic and aerobic reactions. This is contrasted with commercial aerators which bubble up all of the spoils from the bottom and interfere with biological treatment. They impose a severely high biological and chemical load on the flowing stream. In the device shown in FIG. 11 the biological processes are allowed to continue without imposing this load on the flowing stream.

The top of the tower is desirably closed by a dome 116 which for some purposes is desirably light transparent. Gases in the water spilled over the top of stack 107 may be released from the water in the dome 116 and may be periodically or continuously bled therefrom for utilization as a byproduct or for disposal. A typical tower as shown in FIG. 11 will aerate approximately 4,000,000 gallons of water per day.

FIGS. 13 through 15 show a floating aerating mechanism which also incorporates a cavitation rotor 25. This device is intended to float on the top of the body of polluted water 117. An annular float 118 carries a top platform 119 on which a motor 76, air compressor 78, and air compressor motor 79 are mounted. The rotor 25 is submerged in the body of water 117 and is disposed between a lower most waterflow-directing grid 122 and an uppermost baffle plate 123. A spiderlike support bracket 124 carries the baffle 123 and grid 122 from the float 118.

Grid 122 directs polluted water upwardly into the vicinity of the prop 25. The undersurface of baffle 123 is provided with radial vanes 125 which are aligned in the direction in which centrifugal force produced by the rotating prop 25 directs the aerated water back into the body of water through the spaces formed in the spider bracket 124. The flow pattern is indicated by the arrows in FIG. 13.

Baffle 123 is substantially continuous across the top of rotor 25 except for a central opening 126 through which the shaft 36 for the rotor 25 extends. As in the previously described embodiments, the grid 122 has a central bearing 127 on which shaft 36 turns.

As shown in FIG. 15, the float 118 may be anchored by guy lines 130. These guy lines 130 will also prevent rotor countertorque from rotating the float in a direction opposite to the direction of rotation of the prop 25.

The floating aerator of FIG. 13 can be easily moved from one portion of a lake to another portion to aerate localized zones in the lake.

This aerator may also be suitably vaned in the water so that it may be towed by a boat or aerate the central portion of a stagnant lake.

FIGS. 16 through 21 show an embodiment of the invention in which two gasifying rotors are arranged in tandem. The first rotor or bubble generator 131 provides an initial gasifying of the liquid so that the second gasifying rotor 132 can take the bubble nuclei generated in the first rotor 131 to a smaller size. This device provides a dual function and is capable of putting very high quantities of gas into the water. This device can also be used to add a reactive gas and air to a processed liquid. The gas could be added in the bubble generator 131 and the air can be added in the rotor 132.

The device is mounted in a tank 133 containing the liquid 134. Within the tank there is a doughnut-shaped annulus 135. It has a central inlet in its top wall 137 at 136. Immediately inside the inlet 136 the bubble nuclei generator 131 is mounted for rotation on a hollow shaft 140. Gasified water is fed centrifugally by the action of the rotor 131 in the direction of the arrows to the second gasifying rotor 132 which is also mounted on the same shaft 140 and operated at the same speed as rotor 131.

Rotor 132 works on the same cavitation principle as the rotors shown in FIGS. 4 through 9. It has a leading imperforate rounded front 141 and a cavitation producing trailing configuration 142. As shown in FIG. 21, this rotor is rotated in the direction of arrow 143. The rotor 132 has a hollow interior 144 which is pressurized with gas such as air fed to it through the hollow shaft 140. It has top and bottom porous walls 146 and a rear porous wall 147. Top and bottom imperforate wall extensions 148 extend rearwardly beyond the rear porous wall 147.

As best shown in FIG. 21, a cavitation space 151 is formed behind the rotor 132, and the same cavitation technique as hereinbefore described is utilized to form myriad tiny bubbles 42. Tiny bubbles 38 are sheared off of the porous walls 146. In the cavitation space 151 these bubbles grow to large size 41 and are shattered into the myriad tiny bubbles 42 as the enlarged bubbles 41 enter the liquid at its normal liquid pressure.

In this embodiment, the size of the bubbles 41 can be controlled because some air will travel rearwardly through the rear porous wall 147, thus to reduce the vacuum in the cavitation space 151 and prevent the bubbles 41 from reaching as large a size as they would if there were a greater vacuum in the cavitation space.

Gasified liquid is discharged from the annulus 135 through a discharge pipe 152.

The bubble nuclei generator 131 is in the form of a hollow disc-shaped element having top and bottom walls 153, as shown in FIG. 19. The interior of the disc is hollow and has open ended walled cylinders 154 through the disc in a spiral pattern of cylinders, as is shown in FIG. 18. The space 155 within the disc is pressurized with gas. As indicated in FIG. 19, the gas fills the interior of the cylinders 154 and bulges beyond the ends of the cylinders to be sheared off in the form of small bubbles 156 as the disc 131 rotates. These bubbles will be carried with the water as it travels around the annulus 135 to enter the zone of the rotor 132.

The purpose of the pregasifying of liquid which is ultimately fed to the rotor 132 at the discharge end of the annulus 135 is to provide vast quantities of gas in small bubble form in the liquid at the time when the liquid first contacts the rotor 132. As shown in FIG. 21, the bubbles 156 which are in the liquid prior to contact with the rotor 132 will mingle with the bubbles 38 formed on the porous wall 146 and will enter the cavitation space 151 for subsequent shattering.

The apparatus shown in FIGS. 16 through 21 can be used to simply inject tremendous quantities of air into clear water so that the aerated water exiting through the pipe 152 may be used for flotation separation purposes or mining wastes, for example. Clay and gold mixed together can be separated by flocculating the clay with the adsorbed air in the water and floated out of the mixture leaving only the gold. Another use of the apparatus shown in FIGS. 16 through 21 is to treat polluted water having floating solids. The rotating disc 131 will macerate the solids as well as providing a preliminary aeration thereof.

Degasifying of polluted water containing heavy concentration of heavy gases, such as marsh gas, hydrogen sulfide etc., can be accomplished by utilizing apparatus such as shown in FIGS. 1 and 13 in which the rotor is in the form shown in FIGS. 7, 8, and 9 but in which the rotor is turned backwardly in the direction of arrow 56, as shown in FIG. 10. The shape of the blade is such that as this rotor turns in the direction of arrow 56, the liquid will split before it reaches the enlarged head and forms a cavitation space 157 at the front of the rotor in the angle between the tail 52 and wall 51 of the prop. This space will be at a very low pressure, thus to permit the vapor pressure of entrapped gases in the liquid to form as a large bubble 158 in the angle between the tail 52 and wall 51. This bubble will continuously overflow or break off around the edge of the wall 51 into smaller bubbles 161 which flow past the porous wall 48. These bubbles 161 enlarge as they enter another cavitation space 163 behind the head 48. Moreover, air injected through the porous wall 48 will add to the size of these bubbles 161 so that when they leave the trailing edge of the prop, the bubbles will be quite large, as shown at 162, and will readily rise to the surface of the water, pop and release their gases to the atmosphere. The large bubbles 162 will not collapse and shatter as they are supplied with additional air through wall 48. If this device is mounted in a tank, a dome over the tank can collect the noxious gases for subsequent disposal or utilization as a byproduct.

As will be appreciated, it is not possible to give precise sizes for the various bubbles in their various stages of transition.

These sizes will vary considerably, depending on pressure and temperature and liquid and gas characteristics. However, for comparison purposes, relative typical approximate bubble sizes are given as follows. Individual bubbles in each category can range considerably smaller or larger for each category, the following examples being exemplary only:

Bubble 38—40 microns diameter
Bubble 41—12,000 microns diameter
Bubble 42—10 microns diameter
Bubble 156—100 microns diameter
Bubble 162—60,000 microns diameter

I claim:

1. Apparatus for gasifying a liquid, said apparatus comprising a liquid-submerged rotor having an internal chamber, a cavitation producing trailing configuration and a porous wall ahead of said configuration, means to rotate the rotor at a speed sufficient to produce in the liquid a cavitation space behind the said trailing configuration, means for injecting gas under pressure into the said cavity to force the gas through said porous wall into said liquid ahead of said cavitation space in the form of bubbles to be swept by said liquid past said porous wall into said cavitation space for bubble expansion as the bubbles enter said space and disintegration of the expanded bubbles into myriad tiny bubbles as the expanded bubbles leave said space and are shattered by the liquid pressure behind said space, said rotor having a rear wall and top and bottom walls with extensions which project beyond said rear wall to form said cavitation producing configuration, said rear wall being also porous for injection of gas through said rear wall for control of the size of the bubbles formed therein.

2. Apparatus for gasifying a liquid and comprising a liquid-containing tower comprising a flow stack, a rotor near the bottom of the tower, said rotor having an internal chamber and a porous wall, means for rotating the rotor, means for injecting gas into said rotor cavity to force the gas through said porous wall and create tiny gas bubbles adsorbed in the liquid to lighten the liquid in the stack and induce flow of the liquid upwardly in the stack in response to hydrostatic pressure differentials inside the stack and outside the stack, means for withdrawing gasified liquid from the tower near its top, means for introducing ungasified liquid into the tower to make up for the gasified liquid withdrawn therefrom, said tower being positioned above the bed of a natural body of water whereby said bed constitutes said means for introducing ungasified liquid into the tower, and whereby spoils on said bed will not be disturbed by processing of the liquid in the tower.

3. Apparatus for gasifying a liquid and comprising a liquid-containing tower comprising a flow stack, a rotor near the bottom of the tower, said rotor having an internal chamber and a porous wall, means for rotating the rotor, means for injecting gas into said rotor cavity to force the gas through said porous wall and create tiny gas bubbles adsorbed in the liquid to lighten the liquid in the stack and induce flow of the liquid upwardly in the stack in response to hydrostatic pressure differentials inside the stack and outside the stack, means for withdrawing gasified liquid from the tower near its top, means for introducing ungasified liquid into the tower to make up for the gasified liquid withdrawn therefrom and an algae trap about said stack near the top of the tower and means for separating algae clumps from said liquid as it flows over the top of said stack.

4. Apparatus for gasifying a liquid and comprising a liquid-containing tower comprising a flow stack, a rotor near the bottom of the tower, said rotor having an internal chamber and a porous wall, means for rotating the rotor, means for injecting gas into said rotor cavity to force the gas through said porous wall and create tiny gas bubbles adsorbed in the liquid to lighten the liquid in the stack and induce flow of the liquid upwardly in the stack in response to hydrostatic pressure differentials inside the stack and outside the stack, means for withdrawing gasified liquid from the tower near its top, means for introducing ungasified liquid into the tower to make up for the gasified liquid withdrawn therefrom, said tower having a bell chamber immediately above said rotor for containing said means for rotating the rotor and the means for injecting gas into the cavity.

5. Apparatus for gasifying a liquid, said apparatus comprising a liquid-submerged rotor having an internal chamber, a cavitation producing trailing configuration and a porous wall ahead of said configuration, means to rotate the rotor at a speed sufficient to produce in the liquid a cavitation space behind the said trailing configuration, means for injecting gas under pressure into the said cavity to force the gas through said porous wall into said liquid ahead of said cavitation space in the form of bubbles to be swept by said liquid past said porous wall into said cavitation space for bubble expansion as the bubbles enter said space and disintegration of the expanded bubbles into myriad tiny bubbles as the expanded bubbles leave said space and are shattered by the liquid pressure behind said space, said rotor being housed in an enclosure having liquid supply ducts leading to the undersurface of the rotor, the intake to said ducts being provided with a pregasifying rotor by which gas is added in bubbles to the liquid prior to its first contact with said rotor, said enclosure comprising an annulus having two chambers, one in which the rotor is located and the other of which houses the pregasifying mechanism.

6. A tandem gasifier for a liquid and comprising a first rotor having a hollow interior into which gas is injected under pressure and having bubble-forming means, thus to charge liquid flowing past said rotor with gas bubbles, and a second rotor in the path of the stream of liquid containing said gas bubbles and having a hollow interior and means to inject gas thereinto, said second rotor having a cavitation producing trailing configuration and a porous wall ahead of said configuration, means for rotating said second rotor at a speed sufficient to produce in the pregasified liquid a cavitation space at said trailing configuration, and means for injecting gas under pressure into the cavity of the second rotor to force the gas through said porous wall into said pregasified liquid ahead of said cavitation space in the form of bubbles to be swept by the liquid past said porous wall into said cavitation space for bubble expansion as the bubbles enter said space and disintegration of the expanded bubbles into myriads of tiny bubbles as the expanded bubbles leave said space and are shattered by the liquid pressure behind said space, the first rotor comprising a disc with an interior chamber and a series of exit ports from said chamber to the exterior of the disc and through which gas injected into said chamber escapes into the liquid in the form of bubbles, said exit ports being arranged in a spiral pattern on the face of said disc.

7. A tandem gasifier for a liquid and comprising a first rotor having a hollow interior into which gas is injected under pressure and having bubble-forming means, thus to charge liquid flowing past said rotor with gas bubbles, and a second rotor in the path of the stream of liquid containing said gas bubbles and having a hollow interior and means to inject gas thereinto, said second rotor having a cavitation producing trailing configuration and a porous wall ahead of said configuration, means for rotating said second rotor at a speed sufficient to produce in the pregasified liquid a cavitation space at said trailing configuration, and means for injecting gas under pressure into the cavity of the second rotor to force the gas through said porous wall into said pregasified liquid ahead of said cavitation space in the form of bubbles to be swept by the liquid past said porous wall into said cavitation space for bubble expansion as the bubbles enter said space and disintegration of the expanded bubbles into myriads of tiny bubbles as the expanded bubbles leave said space and are shattered by the liquid pressure behind said space, the first rotor comprising a disc with an interior chamber and a series of exit ports from said chamber to the exterior of the disc and through which gas injected into said chamber escapes into the liquid in the form of bubbles, said exit ports being on the top and bottom face of the disc whereby gas issuing therefrom is sheared from the disc faces by said liquid flow radially outwardly over said faces as the rotor turns and imposes centrifugal force on the liquid.

* * * * *